(12) United States Patent
Askari et al.

(10) Patent No.: US 12,330,678 B2
(45) Date of Patent: Jun. 17, 2025

(54) PROBABILISIC SYSTEM AND METHOD FOR AUTONOMOUS VEHICLE CONTROL

(71) Applicant: GM Global Technology Operations LLC, Detroit, MI (US)

(72) Inventors: Hassan Askari, Thornhill (CA); Seyedalireza Kasaiezadeh Mahabadi, Novi, MI (US); Reza Zarringhalam, Whitby (CA); Mohammadali Shahriari, Markham (CA); Khizar Ahmad Qureshi, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/177,913

(22) Filed: Mar. 3, 2023

(65) Prior Publication Data
US 2024/0294184 A1    Sep. 5, 2024

(51) Int. Cl.
| | |
|---|---|
| *B60W 60/00* | (2020.01) |
| *B60W 30/00* | (2006.01) |
| *B60W 50/02* | (2012.01) |
| *B60W 50/029* | (2012.01) |
| *B62D 5/04* | (2006.01) |

(52) U.S. Cl.
CPC ...... *B60W 60/001* (2020.02); *B60W 50/0205* (2013.01); *B60W 30/00* (2013.01); *B60W 2050/0215* (2013.01)

(58) Field of Classification Search
CPC .......... B60W 60/001; B60W 50/0205; B60W 30/00; B60W 2050/0215; B60W 50/029
See application file for complete search history.

(56) References Cited

U.S. PATENT DOCUMENTS

2022/0410916 A1\* 12/2022 Cordeiro ................ B60R 11/04

OTHER PUBLICATIONS

Forson, The Distribution Properties of Two-Parameter Exponential Distribution Order Statistics (Year: 2019).\*
Yang, Reliability Analysis and Fault Diagnosis of Command and Control Network Based on Bayes-GO Method (Year: 2019).\*

\* cited by examiner

*Primary Examiner* — Thomas E Worden
*Assistant Examiner* — Atticus A Cameron
(74) *Attorney, Agent, or Firm* — Vivacqua Crane, PLLC

(57) ABSTRACT

A method for probabilistic autonomous vehicle control includes receiving a plurality of unfiltered sensor signals from a sensor system of a vehicle and determining, in real time, a failure probability of the sensor system using the unfiltered sensor signals. The method further includes determining a failure probability of a plurality of estimation signals at each time step using the failure probability of the sensor system and determining a failure probability of a plurality of Advanced Driver Assistance System (ADAS) subfunction commands using the failure probability of the plurality of estimation signals at each time step. Further, the method includes determining remedial actions for the plurality of ADAS subfunction commands based on the failure probability of the plurality of ADAS subfunction commands.

17 Claims, 1 Drawing Sheet

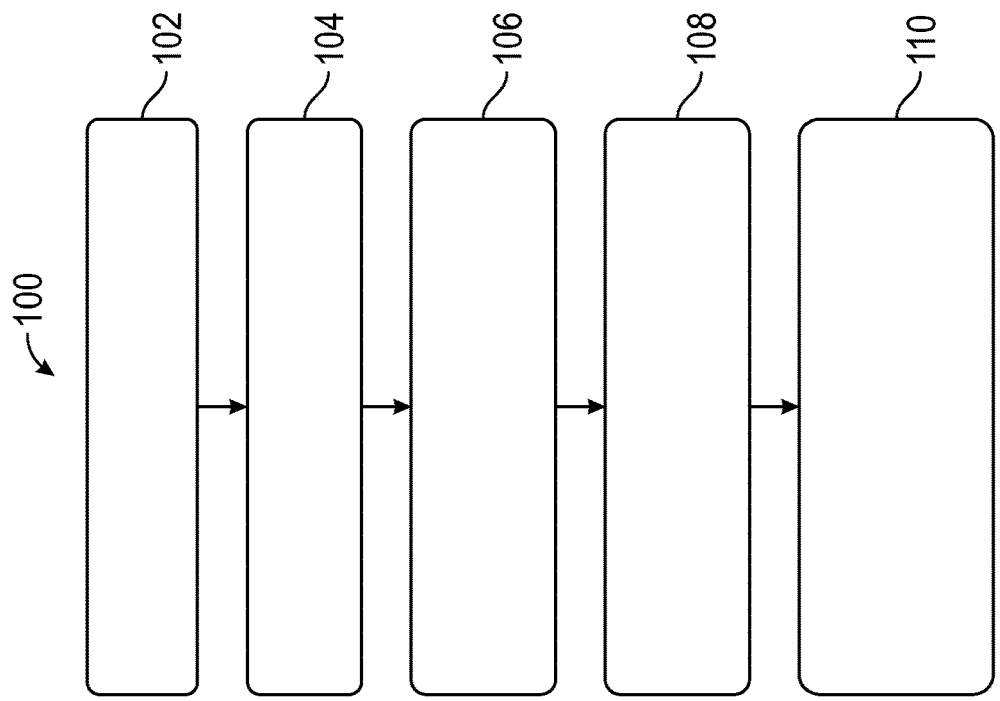
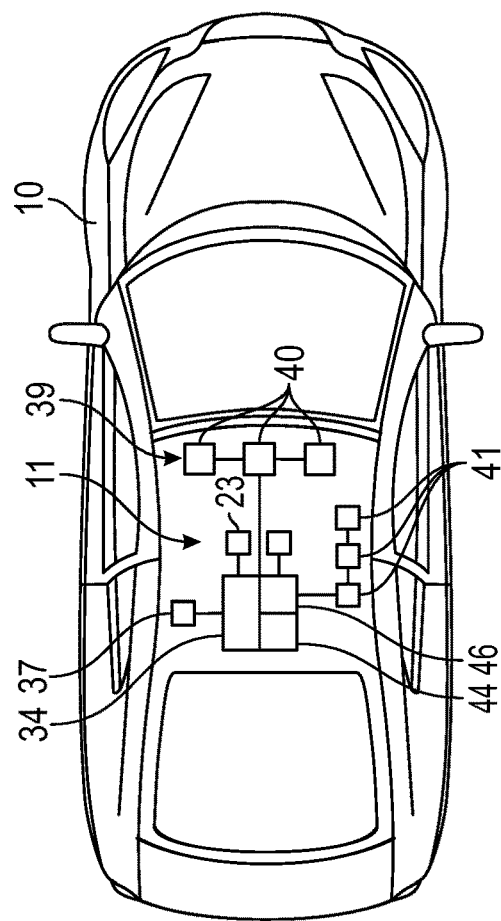
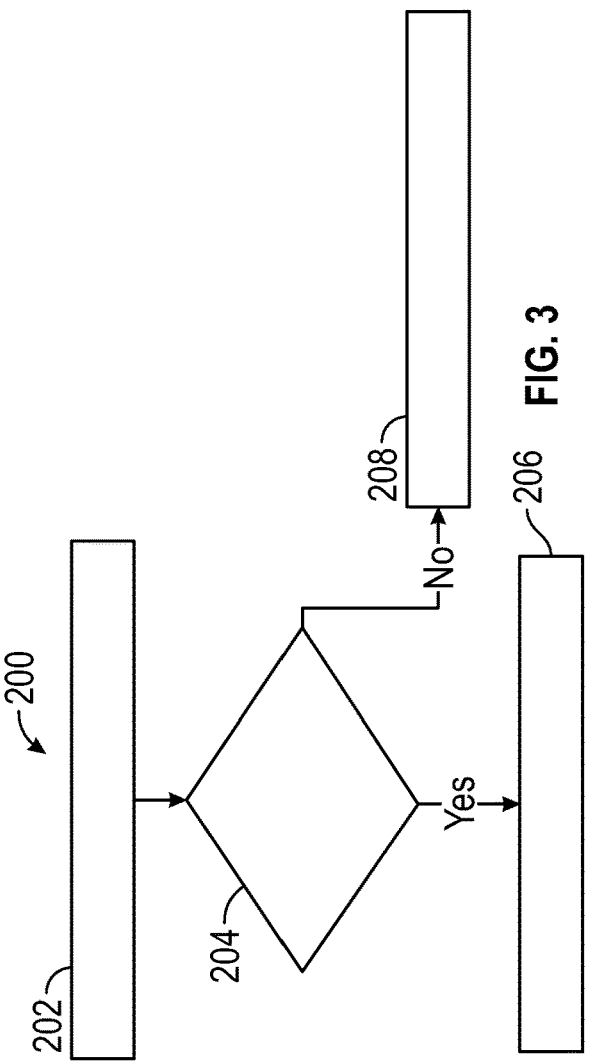

PROBABILISIC SYSTEM AND METHOD FOR AUTONOMOUS VEHICLE CONTROL

INTRODUCTION

The present disclosure relates to a probabilistic method and system for autonomous vehicle control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles may drive autonomously or may be driven by a vehicle occupant. Specifically, the vehicle occupant may select to operate the vehicle manually or autonomously.

SUMMARY

The present disclosure describes a method for probabilistic autonomous vehicle control. The method includes receiving a plurality of unfiltered sensor signals from a sensor system of a vehicle. The sensor system includes a plurality of sensors. The method further includes determining, in real time, a failure probability of the sensor system using the unfiltered sensor signals. The method further includes determining a failure probability of a plurality of estimation signals at each time step using the failure probability of the sensor system. The plurality of the estimation signals is generated using the plurality of unfiltered sensor signals of the sensor system of the vehicle. The method includes determining a failure probability of a plurality of Advanced Driver Assistance System (ADAS) subfunction commands using the failure probability of the plurality of estimation signals at each time step, wherein the plurality of ADAS subfunction commands include an ADAS steering torque command. The method includes determining remedial actions for the plurality of ADAS subfunction commands based on the failure probability of the plurality of Advanced Driver Assistance System (ADAS) subfunction commands. The method includes comparing the failure probability of the ADAS steering torque command with a predetermined threshold to determine whether the failure probability of the ADAS steering torque command is equal to or less than the predetermined threshold. Further, the method includes autonomously controlling the vehicle according to the ADAS steering torque command in response to determining that the failure probability of the ADAS steering torque command is equal to or less than the predetermined threshold.

In an aspect of the present disclosure, the method includes generating a notification in response to determining that the failure probability of the ADAS steering torque command is not equal to or less than the predetermined threshold. The notification requests a vehicle occupant of the vehicle to take over a steering of the vehicle.

In an aspect of the present disclosure, the failure probability of the sensor system is a function of the reliability of the sensor system. The reliability of the sensor system is determined using a following equation:

$$R_t = e^{-\lambda t} + D(t)$$

where:
$R_t$ is the reliability of the sensor system;
e is Euler's constant;
$\lambda$ is a reliability constant;
t is time; and
D(t) is a reliability variation term.

In an aspect of the present disclosure, the method includes determining, in real time, a failure probability of each of the plurality of sensors of the sensor system of the vehicle. The failure probability of the sensor system is a function of the failure probability of each of the plurality of sensors of the sensor system of the vehicle.

In an aspect of the present disclosure, the plurality of Advanced Driver Assistance System (ADAS) subfunction commands include an excessive torque trigger. The failure probability of the plurality of the estimation signals includes a failure probability of a longitudinal velocity of the vehicle and a failure probability of a unified lateral control commanded torque of the vehicle. The failure probability of the plurality of ADAS subfunction commands at each time step includes the failure probability of the excessive torque trigger at each time step. The failure probability of the excessive torque trigger at each time step is determined as a function of the failure probability of the longitudinal velocity of the vehicle and the failure probability of a unified lateral control commanded torque of the vehicle.

In an aspect of the present disclosure, the method uses a Bayesian network to determine the failure probability of the ADAS subfunction commands. The method includes commanding the vehicle to perform the remedial actions in response to determining that the failure probability of the ADAS steering torque command is equal to or less than the predetermined threshold.

The present application also describes a tangible, non-transitory, machine-readable medium, including machine-readable instructions. When executed by a processor, the machine-readable instructions cause the processor to execute the method described above.

The present disclosure also describes a vehicle. The vehicle includes sensors and a vehicle controller in communication with the sensors. The vehicle controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic side view of a vehicle including a system for probabilistic autonomous vehicle control;

FIG. 2 is a flowchart of a method for autonomous vehicle control; and

FIG. 3 is a flowchart of a method for determining whether to operate in autonomous mode or in a manual mode.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for autonomous vehicle control. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The system 11 allows probabilistic fusion of advanced driver-assistance system (ADAS) and driver commands. In some vehicles, the escalation for driver steering torque depends on some safety checks and the availability of critical information such as lane markers. In order to reduce the escalation and ensure its overall consistency, it is desirable to systematically quantify the input integrity, reliability, and failure probability information. In the system 11, the architecture of ADAS steering command is improved considering the abovementioned information. With the use of probabilistic information, it can be decided where and how to transition between a manual mode and a ADAS mode.

The vehicle 10 includes a vehicle controller 34 and one or more sensors 40 in communication with the vehicle controller 34. The sensors 40 are part of a sensor system 39 and each is configured to collect information and generate sensor signals (including sensor data indicative of the collected information). As non-limiting examples, the sensors 40 may include Global Navigation Satellite System (GNSS) transceivers or receivers, yaw rate sensors, speed sensors, lidars, radars, ultrasonic sensors, inertial measurement unit (IMU), wheel speed sensor (WSS), cameras, and steering wheel sensors (SWS), among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The wheel speed sensor measures the speed of the wheels of the vehicle 10. The steering wheel sensors determine the position of the steering wheel.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIGS. 2 and 3), that when executed by the one or more processors, cause the processors 44 to execute the method 100 and the method 200 (FIG. 2 and FIG. 3).

The vehicle 10 includes one or more actuators 42 in communication with the vehicle controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification to the vehicle user of the vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

FIG. 2 is a flowchart of a method 100 for probabilistic autonomous vehicle control. The method begins at block 102. At block 102, the vehicle controller 34 receives a plurality of unfiltered sensor signals from the sensor system 39 of the vehicle 10. Also, at block 102, the vehicle controller 34 determines, in real time, a failure probability of the sensor system 39 using the unfiltered sensor signals. The failure probability of the sensor system 39 is a function of the failure probability of each of the sensors 40 used for a specific ADAS function (e.g., ADAS lane centering). The failure probability of the sensor system 39 is a function of the reliability of the sensor system 39. The reliability of each sensor 40 may be determined using the following equation:

$$R_t = e^{-\lambda t} + D(t) \qquad \text{Eq. 1}$$

where:

$R_t$ is the reliability of the sensor system 39;

e is Euler's constant;

λ is a reliability constant;

t is time; and

D(t) is a reliability variation term.

The equation above considers the anomaly and potential disturbances affecting the reliability of each sensor 40. The reliability variation term D(t) used in the equation above is based on a comparison between the sensor data generated by the sensors 40 and a predetermined desirable performance metrics, which may be provided by the manufacturer of the sensor 40. The comparison between the sensor data and the predetermined desirable performance metric (which may be obtained, for example, by using Real-Time Kinematic (RTK)) may help in the development of a trained machine learning system to adjust the reliability information of the sensor system 39 in a real-time basis. The failure rate of each sensor 40 (and therefore the reliability constant) may be a function of time. At an infant phase of the sensor 40, the failure rate may be high but decrease with time. At the useful life period of the sensor 40, the failure rate may be substantially constant. At the wear-out phase of the sensor 40, the failure rate may increase with time. To accurately determine the reliability and failure probability of each sensor 40, the vehicle controller 34 should perform the following steps. First, the vehicle controller 34 collects raw sensor data (i.e., unfiltered sensor data) for all possible driving maneuvers in certain corners cases. The driving maneuvers should be categorized. Second, the vehicle controller 34 redefines the reliability term of the sensor 40 based on the comparison of the raw sensor data with a reference point, which accurately describes a sensor measurement during the evaluated driving maneuver. The vehicle controller 34 fuses the new data-driven reliability term with the standard reliability equation for each sensor. Then, the vehicle controller 34 provides the total reliability of the sensor system 39 used with all downstream estimations software.

In the ADAS lane centering example, the system 11 uses the GPS, camera, IMU, wheel speed sensor (WSS), radar, and steering wheel sensors (SWS) in its estimation components. Accordingly, the vehicle controller 34 should determine the reliability of each of the sensors 40 mentioned above. To do so, the system 11 may use the following equations:

$$R_{GPS} = e^{-\lambda_{GPS} t} + D_{GPS}(t) \qquad \text{Eq. 1}$$

$$R_{IMU} = e^{-\lambda_{IMU} t} + D_{IMU}(t) \qquad \text{Eq. 2}$$

$$R_{WSS} = e^{-\lambda_{WS} t} + D_{WS}(t) \qquad \text{Eq. 3}$$

$$R_{CM} = e^{-\lambda_{CM} t} + D_{CM}(t) \qquad \text{Eq. 4}$$

$$R_R = e^{-\lambda_R t} + D_R(t) \qquad \text{Eq. 5}$$

$$R_{SWS} = e^{-\lambda_{SW} t} + D_{SW}(t) \qquad \text{Eq. 6}$$

where:

$R_{GPS}$ is the reliability of the GPS transceiver;

$R_{WSS}$ is the reliability of the wheel speed sensor;

$R_{IMU}$ is the reliability of the IMU;

$R_{WSS}$ is the reliability of the radar;

$R_{SWS}$ is the reliability of the steering wheel sensor;

$R_{CM}$ is the reliability of the camera;

e is Euler's constant;

λ is a reliability constant;

t is time;

$D_{IMU}(t)$ is the reliability variation term of the IMU;

$D_{GPS}(t)$ is the reliability variation term of the GPS transceiver;

$D_{CM}(t)$ is the reliability variation term of the camera;

$D_R(t)$ is the reliability variation term of the radar;

$D_{WSS}(t)$ is the reliability variation term of the wheel speed sensor; and $D_{SWS}(t)$ is the reliability variation term of the steering wheel sensor.

In view of the equations above, the total reliability of the sensor system 39 may be determined with the equation below if we assume that the sensor 40 work in series.

$$R_t = R_{GPS} \times R_{IMU} \times R_{WSS} \times R_R \times R_{CM} \times R_{SWS} \times R_o \qquad \text{Eq. 7}$$

where:

$R_{GPS}$ is the reliability of the GPS transceiver;

$R_{WSS}$ is the reliability of the wheel speed sensor;

$R_{IMU}$ is the reliability of the IMU;

$R_{WSS}$ is the reliability of the radar;

$R_{SWS}$ is the reliability of the steering wheel sensor;

$R_{CM}$ is the reliability of the camera;

$R_o$ is the accumulative reliability of other sensors 40 used in ADAS lane centering; and $R_t$ is the total reliability of the sensor system 39.

The equation above may be written in the following form:

$$R_t = e^{-(\lambda_{GPS} + \lambda_{IMU} + \lambda_{WSS} + \lambda_{CM} + \lambda_R + \lambda_{SWS})t} + D_c(t) \qquad \text{Eq. 8}$$

where:

$R_t$ is the total reliability of the sensor system 39;

e is Euler's constant;

t is time; and $D_t(t)$ is the multiplication of all the reliability variation terms in the calculation of $R_t$;

$\lambda_{GPS}$ is a reliability constant of the GPS transceiver;

$\lambda_{IMU}$ is a reliability constant of the IMU;

$\lambda_{WSS}$ is a reliability constant of the wheel speed sensor;

$\lambda_{CM}$ is a reliability constant of the camera;

$\lambda_R$ is a reliability constant of the radar; and $\lambda_{SWS}$ is a reliability constant of the steering wheel sensor.

With the equation above, the vehicle controller 34 can assess the reliability of the sensor system 39. Specifically, the vehicle controller 34 can assess the relation between the reliability of the unfiltered sensor signals and the failure probability of the sensor system 39. Further, the vehicle controller 34 can obtain event-based reliability, which may be obtained using the data-driven approach. The vehicle controller 34 may also provide reliability bounds over the reliability of unfiltered sensor signals, which are used for estimation.

As discussed above, the failure probability of the sensor system 39 is determined at block 102. The failure probability is the counterpart of the reliability of the sensor system 39. The following equations may be used to determine the failure probability of the sensors 40.

$$FP_{GPS} = 1 - \left(e^{-\lambda_{GPS}t} + D_{GPS}(t)\right) \quad \text{Eq. 9}$$

$$FP_{IMU} = 1 - \left(e^{-\lambda_{IMU}t} + D_{IMU}(t)\right) \quad \text{Eq. 10}$$

$$FP_{WSS} = 1 - \left(e^{-\lambda_{WSS}t} + D_{WSS}(t)\right) \quad \text{Eq. 11}$$

$$FP_{CM} = 1 - \left(e^{-\lambda_{CM}t} + D_{CM}(t)\right) \quad \text{Eq. 12}$$

$$FP_R = 1 - \left(e^{-\lambda_R t} + D_R(t)\right) \quad \text{Eq. 13}$$

$$FP_{SWS} = 1 - \left(e^{-\lambda_R t} + D_{SWS}(t)\right) \quad \text{Eq. 14}$$

where:

$\lambda_{GPS}$ is a reliability constant of the GPS transceiver;
$\lambda_{IMU}$ is a reliability constant of the IMU;
$\lambda_{WSS}$ is a reliability constant of the wheel speed sensor;
$\lambda_{CM}$ is a reliability constant of the camera;
$\lambda_R$ is a reliability constant of the radar; and
$\lambda_{SWS}$ is a reliability constant of the steering wheel sensor;
e is Euler's constant;
t is time;
$D_{IMU}(t)$ is the reliability variation term of the IMU;
$D_{GPS}(t)$ is the reliability variation term of the GPS transceiver;
$D_{CM}(t)$ is the reliability variation term of the camera;
$D_R(t)$ is the reliability variation term of the radar;
$D_{WSS}(t)$ is the reliability variation term of the wheel speed sensor; and
$D_{SWS}(t)$ is the reliability variation term of the steering wheel sensor.
$FP_{GPS}$ is the failure probability of the unfiltered sensor signal from the GPS transceiver;
$FP_{IMU}$ is the failure probability of the unfiltered sensor signal from the IMU;
$FP_{SWS}$ is the failure probability of the unfiltered sensor signal from the steering wheel sensor;
$FP_{WSS}$ is the failure probability of the unfiltered sensor signal from the wheel speed sensor;
$FP_{CM}$ is the failure probability of the unfiltered sensor signal from the camera; and
$FP_R$ is the failure probability of the unfiltered sensor signal from the radar.

If it is assumed that the sensor system 39 is arranged in parallel, the failure probability of the simultaneous occurrence of mutually independent events may be determined using the equation below. It is also assumed that the reliability of each sensor 40 is independent of each other.

$$FP_T = FP_R \times FP_{IMU} \times FP_{WS} \times FP_{CM} \times FP_R \times FP_{SW} \quad \text{Eq. 15}$$

where:

$FP_{GPS}$ is the failure probability of the unfiltered sensor signal from the GPS transceiver;
$FP_{IMU}$ is the failure probability of the unfiltered sensor signal from the IMU;
$FP_{SWS}$ is the failure probability of the unfiltered sensor signal from the steering wheel sensor;
$FP_{WSS}$ is the failure probability of the unfiltered sensor signal from the wheel speed sensor;
$FP_{CM}$ is the failure probability of the unfiltered sensor signal from the camera; and
$FP_R$ is the failure probability of the unfiltered sensor signal from the radar.

After block 102, the method 100 proceeds to block 104. At block 104, the vehicle controller 34 determines a failure probability of a plurality of estimation signals at each time step using the failure probability of the sensor system 39. As discussed above, the failure probability of the estimation signals is a function of the reliability of the estimation signals. Block 104 therefore entails determining the reliability of the estimation signals at each time step using the equations discussed above. The estimation signals are generated using the unfiltered sensor signals of the sensor system 39 of the vehicle 10. The estimation signals are signals that include data indicative of a state of the vehicle 10 and/or its environment, such as the estimated longitudinal acceleration, the estimated lateral acceleration, the estimated vertical acceleration, the estimated yaw acceleration, the estimated pitch angle, the estimated roll angle, the estimated yaw angle, the estimated longitudinal velocity, the estimated location of the vehicle 10, objects around the vehicle 10, etc. For example, the longitudinal acceleration of the vehicle 10 may be derived from the unfiltered sensor signal from the IMU of the vehicle 10. In this case, the IMU sends an unfiltered sensor signal to the vehicle controller 34 or another processing unit through a controller area network (CAN). At block 104, the vehicle controller 34 may determine the failure probability of the IMU CAN signal after based on the failure probability of the unfiltered sensor signal from the IMU. The failure probability of the IMU CAN signal is communicated to one or more diagnostic units and to a processing unit. The processing unit filters, adjusts, and arbitrates the unfiltered sensor signal from the IMU and estimates the longitudinal acceleration of the vehicle 10 (i.e., an estimation signal). At this point, the vehicle controller 34 determines the failure probability of the estimation signal (e.g., the estimated longitudinal velocity of the vehicle 10). This estimation signal is then communicated to a consuming software (e.g., ADAS function software). The method 100 then proceeds to block 106.

At block 106, the vehicle controller 34 determines, in real time, the failure probability of a plurality of Advanced Driver Assistance System (ADAS) subfunction commands using the failure probability of the estimation signals at each time step. Thus, the failure probability of the ADAS subfunction commands is a function of the failure probability of the estimations signals and the reliability of the ADAS subfunction commands. As a non-limiting example, the ADAS subfunction commands include an ADAS steering torque command, excessive torque trigger, longitudinal acceleration command, etc. A Bayesian network may be used to determine the failure probability of the ADAS subfunction commands. For example, if it's assumed that a specific ADAS function command (e.g., an excessive torque trigger) is based on specific estimation signals (e.g., the estimated longitudinal velocity and unified lateral control commanded torque), the failure probability of the plurality of that specific ADAS subfunction command (e.g., excessive torque trigger) may be determined using the following equation:

$$\widehat{FP}(\widehat{ET} \mid \hat{V}_x, \ldots, \hat{T}_{ULC}) = \qquad \text{Eq. 16}$$

$$\frac{\widehat{FP}(\hat{V}_x \mid \hat{L}_{CT}, \hat{T}_{ULC}, \widehat{ET})\widehat{FP}(\hat{L}_{CT} \mid \hat{T}_{ULC}, \widehat{ET})\widehat{FP}(\hat{T}_{ULC} \mid \widehat{ET})\widehat{FP}(\widehat{ET})}{\widehat{FP}(\hat{V}_x \mid \hat{L}_{CT}, \hat{T}_{ULC})\widehat{FP}(\hat{L}_{CT} \mid \hat{T}_{ULC})\widehat{FP}(\hat{T}_{ULC})}$$

where:

$\hat{T}_{ULC}$ is an estimation signal for the unified lateral control commanded torque;

$\hat{V}_x$ is an estimation signal for the longitudinal velocity of the vehicle 10.

$\hat{L}_{CT}$ is an estimation signal for the lateral control torque;

$\widehat{ET}$ is the excessive torque trigger;

$\widehat{FP}(\widehat{ET} \mid \hat{V}_x, \ldots, \hat{T}_{ULC})$ is the failure probability of the excessive torque trigger;

$\widehat{FP}(\hat{V}_x \mid \hat{L}_{CT}, \hat{T}_{ULC}, \widehat{ET})$ if the failure probability of the longitudinal velocity;

$\widehat{FP}(\hat{T}_{ULC} \mid \widehat{ET})$ is the failure probability of the unified lateral control commanded torque; and $\widehat{FP}(\hat{L}_{CT} \mid \hat{T}_{ULC}, \widehat{ET})$ is the failure of the lateral control torque.

A formulation similar to the equation above may be used to find the failure probability of other nodes within the network. Then, the method 100 continues to block 108.

At block 108, the vehicle controller 34 determines one or more remedial actions for the plurality of Advanced Driver Assistance System (ADAS) subfunction commands based on the failure probability of the plurality of Advanced Driver Assistance System (ADAS) subfunction commands. A feature moding subsystem may be used to determine the remedial actions. At the same time, the controller component may be fed by the failure probability of the pertinent estimated signals so that it can adjust itself based on the failure probability at each time step. The failure probability of the controller subsystem may also be reported to the feature moding subsystem to decide the proper remedial actions, such as escalation for driving steering input. Next, the method 100 continues to block 110.

With reference to FIGS. 2 and 3, block 110 entails whether to execute the ADAS subfunction command or request driver input based on the failure probability of the ADAS subfunction command (e.g., the ADAS steering torque command), speed regime, driving condition, driving location, and other considerations. FIG. 3 is a method 200 for determining whether to operate in autonomous mode or in a manual mode and represents block 110. The method 200 beings at block 202. At block 202, the vehicle controller 34 receives the ADAS subfunction command (e.g., ADAS steering torque command) and the failure probability of that ADAS subfunction command (e.g., ADAS steering torque command). Then, the method 200 continues to block 204. At block 204, the vehicle controller 34 compares the failure probability of the ADAS steering torque command (or another ADAS subfunction command) with a predetermined threshold to determine whether the failure probability of the ADAS steering torque command (or another ADAS subfunction command) is equal to or less than the predetermined threshold. If the failure probability of the ADAS steering torque command (or another ADAS subfunction command) is equal to or less than the predetermined threshold, then the method 200 continues to block 206. At block 206, the vehicle controller 34 commands the vehicle 10 to autonomously controlling its steering. If the failure probability of the ADAS steering torque command (or another ADAS subfunction command) is greater than the predetermined threshold, then the method 200 proceeds to block 208. At block 208, the vehicle controller 34 generates a notification through the user interface 23. The notification requests a vehicle occupant to manually take over a steering of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for autonomous driving control, comprising:
receiving a plurality of unfiltered sensor signals from a plurality of sensor systems in a vehicle, wherein each of the plurality of sensor systems includes at least one sensor;
determining, in real time, a failure probability of each of the plurality of sensor systems using the unfiltered sensor signals;
generating a plurality of estimation signals from the unfiltered sensor signals by filtering, adjusting, and arbitrating the unfiltered sensor signals, wherein the estimation signals include data indicative of a state of the vehicle and an environment surrounding the vehicle;
determining a failure probability of the plurality of estimation signals at each time step based on the failure probability of each of the plurality of sensor systems;
communicating the plurality of estimation signals and the failure probability of the plurality of estimation signals to an Advanced Driver Assistance System (ADAS) in the vehicle;
generating, by the ADAS, a plurality of ADAS subfunction commands based on the estimation signals;
determining, using a Bayesian network, a failure probability of the plurality of ADAS subfunction commands based on the failure probability of the plurality of estimation signals at each time step;
determining remedial actions for the plurality of ADAS subfunction commands based on the failure probability of the plurality of ADAS subfunction commands;
comparing the failure probability of the ADAS subfunction commands with a predetermined threshold to determine whether the failure probability of the ADAS subfunction commands is equal to or less than the predetermined threshold;
in response to determining that the failure probability of the ADAS subfunction commands is equal to or less than the predetermined threshold, autonomously controlling the vehicle using the ADAS subfunction commands; and
in response to determining that the failure probability of the ADAS subfunction commands are greater than the predetermined threshold, performing the remedial action.

2. The method of claim 1, wherein the remedial action includes generating a notification, wherein the notification requests a vehicle occupant of the vehicle to take over a steering of the vehicle.

3. The method of claim 1, wherein the failure probability of each of the plurality of sensor systems is a function of a reliability of each of the plurality of sensor systems, and the reliability of each of the plurality of sensor systems is determined using a following equation:

$$R_t = e^{-\lambda t} + D(t)$$

where:
$R_t$ is the reliability of the sensor system;
e is Euler's constant;
$\lambda$ is a reliability constant;
t is time; and
D (t) is a reliability variation term, wherein the reliability variation term D (t) is determined by:
collecting the unfiltered sensor data for all possible driving maneuvers in certain cases;
categorizing the driving maneuvers; and
redefining the reliability variation term based on a comparison of the unfiltered sensor data with a reference point which accurately describes a sensor measurement during the evaluated driving maneuver.

4. The method of claim 1, wherein determining whether to control the vehicle using the ADAS subfunction commands or taking remedial action is further based on a speed of the vehicle, driving conditions of the vehicle, and a location of the vehicle.

5. The method of claim 3, wherein the plurality of ADAS subfunction commands include an excessive torque trigger which is determined using estimation signals including an estimated longitudinal velocity of the vehicle and a unified lateral control commanded torque, and the probability of failure of the excessive torque trigger is determined using the following equation:

$$FP(ET|\hat{V}_x, \ldots, \hat{T}_{ULC}) = \frac{FP(\hat{V}_x|\hat{L}_{CT}, \hat{T}_{ULC}, ET)FP(\hat{L}_{CT}|\hat{T}_{ULC}, ET)FP(\hat{T}_{ULC}|ET)FP(ET)}{FP(\hat{V}_x|\hat{L}_{CT}, \hat{T}_{ULC})FP(\hat{L}_{CT}|\hat{T}_{ULC})FP(\hat{T}_{ULC})}$$

where:
$\hat{T}_{ULC}$ is an estimation signal for the unified lateral control commanded torque;

$\hat{V}_x$ is an estimation signal for the longitudinal velocity of the vehicle;

$\hat{L}_{CT}$ is an estimation signal for the lateral control torque;

$\widehat{ET}$ is the excessive torque trigger;

$\widehat{FP}(\widehat{ET}|\hat{V}_x, \ldots, \hat{T}_{ULC})$ is the failure probability of the excessive torque trigger;

$\widehat{FP}(\hat{V}_x|\hat{L}_{CT}, \hat{T}_{ULC}, \widehat{ET})$ if the failure probability of the longitudinal velocity;

$\widehat{FP}(\hat{T}_{ULC}|\widehat{ET})$ is the failure probability of the unified lateral control commanded torque; and $\widehat{FP}(\hat{L}_{CT}|\hat{T}_{ULC}, \widehat{ET})$ is the failure of the lateral control torque.

6. The method of claim 1, further comprising determining, in real time, a total failure probability of the sensor systems by calculating a combined likelihood of failure from the failure probabilities of each of the plurality of sensor systems.

7. A tangible, non-transitory, machine-readable medium, comprising machine-readable instructions, that when executed by a processor, cause the processor to:

receive a plurality of unfiltered sensor signals from a plurality of sensor systems in a vehicle, wherein each of the plurality of sensor systems includes at least one sensor;

determine, in real time, a failure probability of each of the plurality of sensor systems using the unfiltered sensor signals;

generate a plurality of estimation signals from the unfiltered sensor signals by filtering, adjusting, and arbitrating the unfiltered sensor signals, wherein the estimation signals include data indicative of a state of the vehicle and an environment surrounding the vehicle;

determine a failure probability of the plurality of estimation signals at each time step based on the failure probability of each of the plurality of sensor systems;

communicate the plurality of estimation signals and the failure probability of the plurality of estimation signals to an Advanced Driver Assistance System (ADAS) in the vehicle;

generate, by the ADAS, a plurality of ADAS subfunction commands based on the estimation signals;

determine, using a Bayesian network, a failure probability of the plurality of ADAS subfunction commands based on the failure probability of the plurality of estimation signals at each time step;

determine remedial actions for the plurality of ADAS subfunction commands based on the failure probability of the plurality of ADAS subfunction commands;

compare the failure probability of the ADAS subfunction commands with a predetermined threshold to determine whether the failure probability of the ADAS subfunction commands is equal to or less than the predetermined threshold;

in response to determining that the failure probability of the ADAS subfunction commands is equal to or less than the predetermined threshold, autonomously control the vehicle using the ADAS subfunction commands; and in response to determining that the failure probability of the ADAS subfunction commands are greater than the predetermined threshold, perform the remedial action.

8. The non-transitory, machine-readable medium of claim 7, wherein the remedial action includes generating a notification, wherein the notification requests a vehicle occupant of the vehicle to take over a steering of the vehicle.

9. The non-transitory, machine-readable medium of claim 8, wherein the failure probability of each of the plurality of sensor systems is a function of a reliability of each of the plurality of sensor systems, and the reliability of each of the plurality of sensor systems is determined using a following equation:

$$R_t = e^{-\lambda t} + D(t)$$

where:

$R_t$ is the reliability of the sensor system;

e is Euler's constant;

$\lambda$ is a reliability constant;

t is time; and

D (t) is a reliability variation term, wherein the reliability variation term D (t) is determined by:
collecting the unfiltered sensor data for all possible driving maneuvers in certain cases;
categorizing the driving maneuvers; and
redefining the reliability variation term based on a comparison of the unfiltered sensor data with a reference point which accurately describes a sensor measurement during the evaluated driving maneuver.

10. The non-transitory, machine-readable medium of claim 7, wherein determining whether to control the vehicle using the ADAS subfunction commands or taking remedial action is further based on a speed of the vehicle, driving conditions of the vehicle, and a location of the vehicle.

11. The non-transitory, machine-readable medium of claim 10, wherein the plurality of ADAS subfunction commands includes an excessive torque trigger which is determined using estimation signals including an estimated longitudinal velocity of the vehicle and a unified lateral control commanded torque, and the probability of failure of the excessive torque trigger is determined using the following equation:

$$\widehat{FP}(\widehat{ET}|\hat{V}_x, \ldots, \hat{T}_{ULC}) = \frac{\widehat{FP}(\hat{V}_x|\hat{L}_{CT}, \hat{T}_{ULC}, \widehat{ET})\widehat{FP}(\hat{L}_{CT}|\hat{T}_{ULC}, \widehat{ET})\widehat{FP}(\hat{T}_{ULC}|\widehat{ET})\widehat{FP}(\widehat{ET})}{\widehat{FP}(\hat{V}_x|\hat{L}_{CT}, \hat{T}_{ULC})\widehat{FP}(\hat{L}_{CT}|\hat{T}_{ULC})\widehat{FP}(\hat{T}_{ULC})}$$

where:

$\hat{T}_{ULC}$ is an estimation signal for the unified lateral control commanded torque;

$\hat{V}_x$ is an estimation signal for the longitudinal velocity of the vehicle;

$\hat{L}_{CT}$ is an estimation signal for the lateral control torque;

$\widehat{ET}$ is the excessive torque trigger;

$\widehat{FP}(\widehat{ET}|\hat{V}_x, \ldots, \hat{T}_{ULC})$ is the failure probability of the excessive torque trigger;

$\widehat{FP}(\hat{V}_x|\hat{L}_{CT}, \hat{T}_{ULC}, \widehat{ET})$ if the failure probability of the longitudinal velocity;

$\widehat{FP}(\hat{T}_{ULC}|\widehat{ET})$ is the failure probability of the unified lateral control commanded torque; and $\widehat{FP}(\hat{L}_{CT}|\hat{T}_{ULC}, \widehat{ET})$ is the failure of the lateral control torque.

12. The non-transitory, machine-readable medium of claim 11, further comprising machine-readable instructions, that when executed by a processor, cause the processor to:
   determine, in real time, a total failure probability of the sensor systems by calculating a combined likelihood of failure from the failure probabilities of each of the plurality of sensor systems.

13. A system for autonomous driving control, comprising:
   a plurality of sensors; and
   a vehicle controller in communication with the plurality of sensors, wherein the vehicle controller is programmed to:
      receive a plurality of unfiltered sensor signals from a plurality of sensor systems in a vehicle, wherein each of the plurality of sensor systems includes at least one of the plurality of sensors;
      determine, in real time, a failure probability of each of the plurality of sensor systems using the unfiltered sensor signals;
      generate a plurality of estimation signals from the unfiltered sensor signals by filtering, adjusting, and arbitrating the unfiltered sensor signals, wherein the estimation signals include data indicative of a state of the vehicle and an environment surrounding the vehicle;
      determine a failure probability of the plurality of estimation signals at each time step based on the failure probability of each of the plurality of sensor systems;
      communicate the plurality of estimation signals and the failure probability of the plurality of estimation signals to an Advanced Driver Assistance System (ADAS) in the vehicle;
      generate, by the ADAS, a plurality of ADAS subfunction commands based on the estimation signals;
      determine, using a Bayesian network, a failure probability of the plurality of ADAS subfunction commands based on the failure probability of the plurality of estimation signals at each time step;
      determine remedial actions for the plurality of ADAS subfunction commands based on the failure probability of the plurality of ADAS subfunction commands;
      compare the failure probability of the ADAS subfunction commands with a predetermined threshold to determine whether the failure probability of the ADAS subfunction commands is equal to or less than the predetermined threshold;
      in response to determining that the failure probability of the ADAS subfunction commands is equal to or less than the predetermined threshold, autonomously control the vehicle using the ADAS subfunction commands; and
      in response to determining that the failure probability of the ADAS subfunction commands are greater than the predetermined threshold, perform the remedial action.

14. The system of claim 13, wherein the remedial action includes generating a notification, wherein the notification requests a vehicle occupant of the vehicle to take over a steering of the vehicle.

15. The system of claim 14, wherein the failure probability of each of the plurality of sensor systems is a function of a reliability of each of the plurality of sensor systems, and the reliability of each of the plurality of sensor systems is determined using a following equation:

$$R_t = e^{-\lambda t} + D(t)$$

where:
   $R_t$ is the reliability of the sensor system;
   e is Euler's constant;
   $\lambda$ is a reliability constant;
   t is time; and
   D (t) is a reliability variation term, wherein the reliability variation term D (t) is determined by:
      collecting the unfiltered sensor data for all possible driving maneuvers in certain cases;
      categorizing the driving maneuvers; and
         redefining the reliability variation term based on a comparison of the unfiltered sensor data with a reference point which accurately describes a sensor measurement during the evaluated driving maneuver.

16. The system of claim 15, wherein determining whether to control the vehicle using the ADAS subfunction commands or taking remedial action is further based on a speed of the vehicle, driving conditions of the vehicle, and a location of the vehicle.

17. The system of claim 16, wherein the plurality of ADAS subfunction commands includes an excessive torque trigger which is determined using estimation signals including an estimated longitudinal velocity of the vehicle and a unified lateral control commanded torque, and the probability of failure of the excessive torque trigger is determined using the following equation:

$$FP(\widehat{ET}|\hat{V}_x,\ldots,\hat{T}_{ULC}) = \frac{FP(\hat{V}_x|\hat{L}_{CT},\hat{T}_{ULC},\widehat{ET})FP(\hat{L}_{CT}|\hat{T}_{ULC},\widehat{ET})FP(\hat{T}_{ULC}|\widehat{ET})FP(\widehat{ET})}{FP(\hat{V}_x|\hat{L}_{CT},\hat{T}_{ULC})FP(\hat{L}_{CT}|\hat{T}_{ULC})FP(\hat{T}_{ULC})}$$

where:
   $\hat{T}_{ULC}$ is an estimation signal for the unified lateral control commanded torque;
   $\hat{V}_x$ is an estimation signal for the longitudinal velocity of the vehicle;
   $\hat{L}_{CT}$ is an estimation signal for the lateral control torque;
   $\widehat{ET}$ is the excessive torque trigger;
   $FP(\widehat{ET}|\hat{V}_x,\ldots,\hat{T}_{ULC})$ is the failure probability of the excessive torque trigger;
   $FP(\hat{V}_x|\hat{L}_{CT},\hat{T}_{ULC},\widehat{ET})$ if the failure probability of the longitudinal velocity;
   $FP(\hat{T}_{ULC}|\widehat{ET})$ is the failure probability of the unified lateral control commanded torque; and
   $FP(\hat{L}_{CT}|\hat{T}_{ULC},\widehat{ET})$ is the failure of the lateral control torque.

* * * * *